Aug. 30, 1960     J. R. HUBER     2,950,766
AIRCRAFT ROTOR BLADE CONSTRUCTION
Filed Sept. 20, 1954

INVENTOR
John Richard Huber
BY Harris S. Campbell.
ATTORNEY

United States Patent Office 2,950,766
Patented Aug. 30, 1960

2,950,766

AIRCRAFT ROTOR BLADE CONSTRUCTION

John Richard Huber, Warrington, Pa., assignor to Eastern Rotorcraft Corporation, Doylestown, Pa., a corporation of Pennsylvania Filed Sept. 20, 1954, Ser. No. 457,028

8 Claims. (Cl. 170—159)

This invention relates to rotary wing aircraft and is particularly directed to an improved rotor blade construction for use with aircraft rotors.

The blades of aircraft rotors must be constructed to fulfill a considerable number of requirements in order to provide satisfactory structural strength and eliminate undesirable operational characteristics. Thus, to prevent undesirable torsional twist under the lift and centrifugal forces in operation, the blade construction must be not only torsionally stiff but the chordwise center of gravity and the location of the centrifugal attachment fittings at the root end must be located close to the aerodynamic center of pressure of the blade airfoil section. Further requirements for a blade of all metal construction are that the blades, structural parts and surfaces must be smooth and free from defects or discontinuities which might accentuate stresses which produce fatigue and might cause premature failure of the blade structure. A rotor blade is subject to unusually severe fatigue operating conditions because of its mode of operation. Centrifugal loads apply basic stresses on which are superimposed fluctuating bending stresses of varying degrees and frequencies due to the variation in air loads throughout each cycle of rotation. Additional fluctuating stresses are induced by natural bending frequencies in the relatively flexible structure of the blade, particularly in the direction transverse to the plane of rotation.

One of the primary objects of the invention is the provision for an improved blade construction in which the blade spar is made in two longitudinal sections which are joined close to the neutral axis of transverse bending in the blade. This construction permits the forming of a torsionally stiff nose section blade spar of generally flattened D shape in which all joints are kept away from the outside of the spar where maximum bending stresses occur.

A further object of the invention is the provision of a metal rotor blade spar construction in which the upper and lower sections can be drawn by an extrusion process which requires only a relatively simple die and in which the quality of the extrusion may be accurately controlled to give reliable strength characteristics. In drawing extrusions in which closed cavities are included, the drawing dies are not only extremely expensive but great difficulty is experienced in holding the accuracy of the contour and wall thicknesses. A further difficulty is experienced in maintaining even flow characteristics through the die so that quality and consequent strength of the resulting product is not uniform. As a result the guaranteed physical values of a closed section extrusion are appreciably reduced as compared to those of an open section extrusion. The use of an open section permits the added safety because complete inspection of the inner surfaces of the blade spar before assembly may be made thereby avoiding the possibility of undetected imperfections which might cause increased local stresses and detrimental fatigue conditions during operation.

A further specific object of the invention is the construction of a blade in which the spar is symmetrical about the chordline so that the complete spar may be fabricated from identical upper and lower parts or sections thus requiring only a single extrusion die for the manufacture of the spar parts. This object involves the use of a symmetrical section airfoil or one in which at least the nose portion in the region of the spar is symmetrical.

In order to assemble the parts of the metal blade to avoid serious problems from fatigue stresses, it is essential that the parts be designed for assembly without having rivet holes, spot welds, or the like at the points involving maximum bending stresses, that is, at the upper and lower surfaces of the blades. In order to provide for assembly of the spar of the present invention, the construction involves a shape which produces increased area at the joining surfaces thereby permitting the use of a metal adhesive to produce an adequate assembly process. Applicant's construction further contemplates a shape which allows the use of rivets, or the like, to be used close to the neutral axis without providing discontinuity in the maximum stress surfaces at the outer portion of the blade.

In order to assure that the finished rotor blade has its center of gravity at the proper chordwise location so that it coincides approximately with the center of pressure location for the airfoil, additional weight in the form of ballast is usually necessary along the leading edge portion of the blade. It is an object of the present invention to provide a nose shape for the spar section which is increased in thickness to give not only added surface area for the assembly process but also additional local weight so that a minimum amount of ballast is needed. The nose shape is further formed during the extrusion process to accommodate ballast material in the form of a cylindrical rod.

A still further object of the invention is the provision of a terminal connecting fitting which permits the transfer of most of the load from the blade to the fitting through the medium of adhesives, thereby avoiding detrimental discontinuities which might induce fatigue stress concentrations. The fitting further is constructed so that where fastening holes are used they are located at a position where a minimum of detrimental effect is involved.

How the foregoing and other advantages of this invention are obtained will be clear from the following description of the drawings in which—

Figure 1:
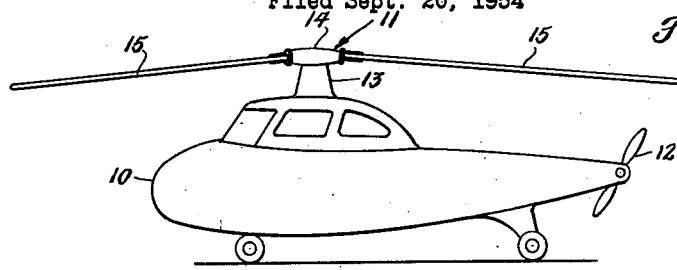
Figure 1 is a side elevational view of an aircraft incorporating rotor blades to which the present invention may be applied.

The helicopter shown in Figure 1 is of the single rotor type having a fuselage 10 and a main rotor 11. At the rear end of the fuselage 10 a small rotor 12 is provided to maintain directional control. The main rotor 11 is mounted over the cabin of the fuselage 10 by a pylon structure 13. Rotor 11 incorporates a hub unit 14 to which the rotor blades 15 are attached. Blades 15 are usually connected to the hub for movement with respect thereto either in the flapping or drag sense or both depending upon the rotor system being used. In order to provide for control of the helicopter a pitch change mounting is generally incorporated at the root of each blade to provide the required blade control movements.

Figure 2:
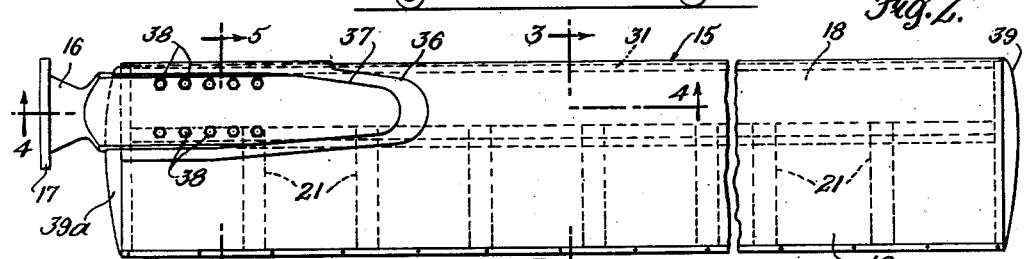
Figure 2 is a plan view to an enlarged scale of a rotor blade incorporating the construction of the present invention.

In Figure 2 is shown one of the rotor blades 15 to an enlarged scale. At the inboard end of the blade 15 there is attached a fitting 16 which is used to transmit the loads between the blade 15 and the rotor hub 14 through suitable connecting parts. Fitting 16 incorporates a flange 17 which provides for a bolted connection to the hub mechanism, thus permitting removal of the blade as a unit. The details of the construction of the rotor blade 15 will be more clearly seen from Figures 2, 3, 4 and 5.

The rotor blade proper consists chiefly of a nose spar member 18 which extends the length of the blade and a skin 19 which wraps around the spar 18 and extends rearwardly to the trailing edge 20 thus forming the airfoil section of the blade. Light ribs 21 extend from the rear of the spar unit 18 to the trailing edge and serve to support the skin 19 and maintain proper airfoil shape under operational air pressures.

Figure 3:
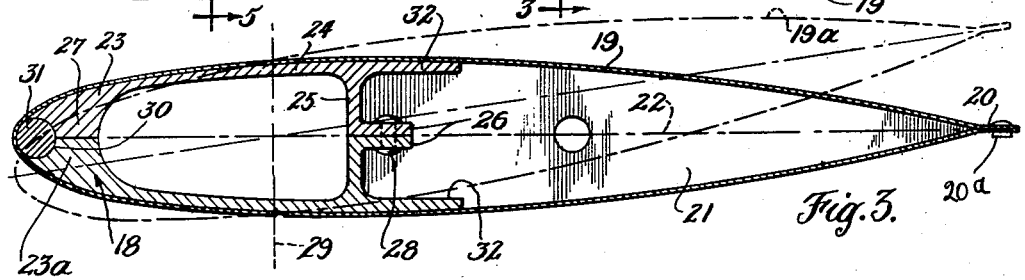
Figure 3 is a sectional view taken through the blade in the direction of arrows 3—3, Figure 2 to a larger scale.
Figure 5:
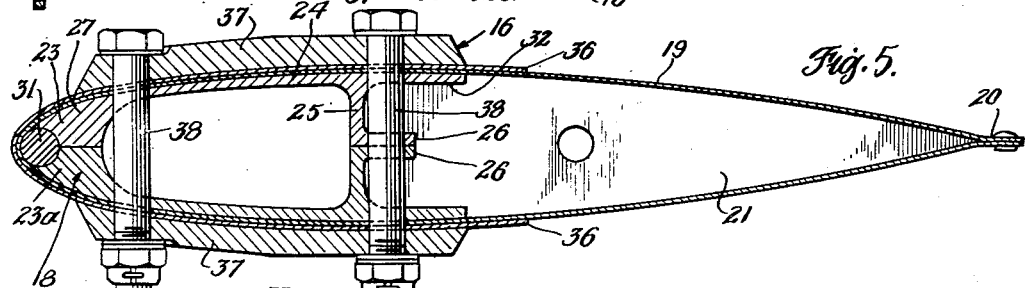
Figure 5 is a sectional view through the fitting taken in the direction of arrows 5—5, Figure 2.

From Figure 3 the details of construction and assembly of the spar unit 18 will be clear. The airfoil section illustrated in Figures 3 and 5 is the symmetrical type in which the shape is the same above and below the chord line 22. The chord line 22 thus becomes the neutral bending axis of the blade section. Spar unit 18 is made from an upper section 23 and a lower section 23a. These two sections are exactly the same cross sectional shape and thus spar parts 23 and 23a can be made from the same extrusion die. Each section 23 and 23a has an external shape along the upper and lower surface which conforms closely to the nose shape of the airfoil section being used, so that when skin 19 is applied to the outside of spar unit 18 the true airfoil section is produced. The outer wall 24 of spar member 23 is made sufficiently thick to give the desired strength. In order to produce a torsionally stiff spar unit, the upper and lower spar sections 23 and 23a are joined together at the chord line 22 by means of a suitable commercial metal adhesive, such as FM–47 manufactured by Bloomingdale Rubber Company. A suitable connection is made with this adhesive by the use of pressure and relatively low temperature heat application. To accomplish an adequate cementing operation, it is desirable to have a relatively large area of contact. For this reason, rear wall 25 of each spar section 23, 23a is provided with a flange 26 extending rearwardly adjacent the chord line 22. The nose portion of spar parts 23 and 23a is thickened appreciably as indicated at 27 and thus also produces a large area of contact at the joint between the upper and lower spar sections 23 and 23a. If desired, occasional rivets 28 may be inserted at intervals to hold flanges 26 in proper relative position and prevent the start of an adhesive separation under fatigue operating conditions. Metal adhesives of the kind currently in use have excellent shear strength but are not recommended for the transmission of tensile loads across the bond. It is, therefore, desirable to protect the main structural adhesive joints against incidental tensile forces and vibrational loads which might tend to start a "peeling" action at the adhesive joint. The riveted center flange construction adequately protects against such progressive failure of the spar bond without introducing any detrimental stress concentration points in the structure.

The aerodynamic center of pressure of the airfoil shown lies at approximately the 25% chord as indicated by line 29 in Figure 3 which is preferably located an appreciable distance forward of the rear wall 25. It is desirable in order to produce a proper balance of centrifugal and lift forces that the center of gravity of the blade structure also should lie at the 25% point particularly in the outer one-third of the blade where the aerodynamic and centrifugal forces are greatest. In order to locate the center of gravity of the complete blade on this line 29, it is necessary that the blade structure aft of the spar should be kept as low in weight as possible. This, however, is usually insufficient to produce the proper balance so that it is necessary to increase the weight of the blade structure in the nose region to produce the proper relationship. Thus thickening of the spar at 27, in addition to providing the increased area for the bonded connection, also serves to give added weight in the region where this is desired for proper ballast purposes. In addition, a special shape is given to the nose portion formed by spar sections 23 and 23a by incorporating a generally circular shaped cavity 30. This serves to support a ballast rod 31 in position when the two spar sections are mounted in assembled relation. Rod 31 is in the most forward region of the blade and is thus most effective as a balancing medium. At the rear end of each spar section 23 and 23a a rearward wall projection 32 extends a short distance aft of the vertical wall 25 in order to give added strength to the spar assembly and also to provide additional support to skin 19 for maintaining an accurate external contour for the airfoil.

After completion of the spar unit 18 the skin 19 is applied using metal adhesive to connect it to the outer surfaces of the spar. With the ribs 21 set in position, the skin is fastened thereto by means of the adhesive and finally the upper and lower skin surfaces are cemented together along the trailing edge to complete the structure. This assembly operation, as well as the spar assembly is preferably handled in a suitable fixture to provide for accuracy. If desired, the trailing edge may be reinforced by small rivets 20a to prevent the start of a separating action in the adhesive between the upper and lower skin. It will be noted that the nose of skin 19 has a leading edge radius which fits accurately around ballast rod 31 to form an assembly in which all parts are supported in proper relative position.

It is often desirable to construct a helicopter rotor blade with a built-in twist to give decreased pitch at the outboard portion of the blade. With the two piece spar construction shown this twist may be built into the spar by assembling the upper and lower spar sections in a fixture having the proper twist incorporated. Since the open spar sections before assembly are relatively flexible in a torsional sense, they are easily twisted without exceeding the elastic limit of the material or inducing any appreciable stresses. Once the spar sections are fastened together in this twisted position they form a closed section which is torsionally rigid and incorporates the desired built-in twist. This twist is illustrated by the dotted outline 19a in Figure 3 which would represent the airfoil contour at the outer end of the blade after fabrication of the built-in twist. This construction provides a blade twist without the need for deforming the spar structure to a point beyond the elastic limit such as would be necessary to produce a permanent set with a closed section spar of normal construction.

Figure 6:
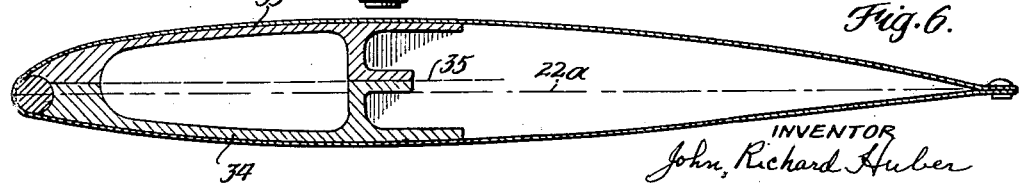
Figure 6 is a sectional view somewhat similar to Figure 3 taken through a blade having a unsymmetrical airfoil section.

Figure 6 illustrates a blade section in which the airfoil used is of unsymmetrical section, the upper section of the airfoil having greater relative curvature than the lower section. Thus the chord line 22a lies nearer the bottom surface than the top surface. To form the spar with upper and lower portions in this unsymmetrical section, it is necessary to use two extrusion dies, one to form the upper section 33 of the spar and another to form the lower section 34 of the spar. If desired, the sections may be designed to join at the chord line 22a. However, in order to provide the greatest strength in bending and relieve the bonded connection from stress, it is preferable to make the joining plane at a location approximately midway between the upper and lower surfaces of the section. In this way, the joint line 35 lies above the chord line 22a and is approximately at the neutral axis of bending in the direction transverse to the chord of the blade.

Figure 4:
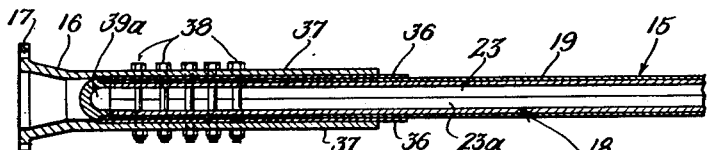
Figure 4 is a longitudinal sectional view through the fitting connection taken in the direction of arrows 4—4, Figure 2.

The detail construction of root end fitting 16 and its attachment to blade 15 are shown in Figures 4 and 5. Shaped to fit the curvature at the forward portion of the blade at the inner end are upper and lower reinforcing metal sheets 36. Reinforcement sheets 36 are shaped to extend beyond the edges of the fitting 16 and are fastened to the blade surface by metal adhesive. Fitting 16 is shaped with upper and lower attachment plates 37 which extend from the shank of fitting 16 to cover a considerable area at the inboard end of the blade, the area being slightly less than reinforcement sheet 36. As will be seen in Figure 5 the inner surfaces of plates 37 are curved to fit the curvature of reinforcing sheet 36. The external surfaces of fitting plates 37 are machined to a convenient shape preferably with flat surfaces to facilitate manufacture. Plates 37 of the terminal fitting 16 are also fastened in place by means of metal adhesive. At the inboard end of the blade, the fitting is provided with additional fastening means in the form of bolts which pass through the attachment plates 37, reinforcement sheets 36, blade skin 19 and blade spar 18. It will be noted in Figure 5 that bolts 38 are located to pass through the spar close to the thickened nose section 27 and close to the rear wall 25 of the spar. With this construction the tensile forces holding bolts 38 in position are carried directly in the front and rear walls of the spar and thus do not tend to distort the upper and lower spar surfaces. This location of the bolts 38 eliminates the need for inserting a filler block in the spar in the region of the bolts.

Actually the area of fitting plates 37 outboard of the bolts 38 is sufficiently great to transfer all of the blade loads to the fitting through the medium of the adhesive bond. The reinforcing sheet 36 assists in the transfer of the loads from the blade proper to the fitting plates 37 and serves to reduce concentration of stress which might develop a local fatigue condition. The bolts 38 give protection in the event of fatigue failure in the metal adhesive between the blade and fitting plates 37.

The tip end and root end of the blade are closed by suitably shaped members 39 and 39a which may be made from light weight material such as plastic or magnesium. Preferably these closure members are cast and held in position by metal adhesive. Members 39 and 39a will be exactly the same in the case of a blade with symmetrical airfoil section. For an unsymmetrical section right and left hand members are used.

The preferred material of the spar unit is high strength aluminum alloy but may also be other metal capable of being extruded or shaped to provide the features described above.

From the foregoing it will be clear that I have provided an improved rotor blade construction in which the fabrication and assembly are greatly simplified with consequent reduction in cost and which at the same time incorporates structural and dynamic characteristics which are ordinarily obtained only by more complex constructions. With the two piece spar construction an open-type extrusion die is satisfactory and the cost of this die can be kept very low because of its relatively simple shape. The open shape of the spar sections also permits more thorough inspection and allows fabrication of a spar with built-in twist by improved methods which do not involve severe distortion of parts. The particular shape of the spar sections allows assembly by the use of adhesives and provides for the application of nose ballast in an improved fashion. This construction provides for riveting of the rear end of the spar assembly in a location which avoids stress concentrations. The spar shape further provides for accurate airfoil shape by giving adequate support to the skin over a large percentage of the chord of the blade. The improved terminal fitting provides for direct and efficient transfer of the loads from the blade to the hub by means of a structure which is easily assembled.

I claim:

1. An aircraft rotor blade of airfoil cross section having a spar member with a cross section of generally flattened D-shape, said spar being constructed of upper and lower sections with a joining surface at the median portion of the blade airfoil section, the nose wall of said spar having a thickened section and the vertical wall of the D-shape having rearwardly projecting flanges at the upper and lower surfaces of the spar as well as at the central part of the spar to form the rear portion of the joining surface.

2. An aircraft rotor blade having a spar member of flattened D-shape cross section, said spar member having a curved nose portion and a vertical wall, said spar member being formed of two longitudinal sections joined along a generally horizontal plane lying close to the neutral bending axis of the spar, said curved nose portion having a thickened nose wall and said vertical wall of the spar member having a flange adjacent said horizontal plane in both the upper and lower sections said thickened nose walls and said flanges thereby providing a large area cementing surface between the two spar sections.

3. A construction according to claim 2 in which the nose portion of both the upper and lower spar sections incorporates a longitudinal groove at the leading edge to form a cylindrical channel for the support of a ballast rod.

4. A construction according to claim 2 in which the spar assembly supports a thin metal skin wrapped around the nose and upper and lower sides, the skin extending rearwardly to the trailing edge to form the complete airfoil contour of the blade.

5. A construction according to claim 2 in which the nose portion of the spar incorporates a circular ballast rod supported along the leading edge, a thin metal skin formed with a leading edge curvature to fit the radius of said rod, said skin extending over the upper and lower surfaces of the spar and back to the trailing edge of the blade airfoil.

6. An aircraft rotor blade having a spar member of flattened D-shape, said spar being formed of an upper section and a lower section joined together at a generally horizontal plane located close to the neutral axis of transverse bending, said spar having a thickened nose section and a rearward vertical wall, flanges projecting rearwardly from the vertical wall at the upper and lower surfaces of the blade, a thin skin extending around the nose and upper and lower surfaces of the spar to form the external contour of the blade airfoil section, a terminal fitting for the blade having upper and lower members formed to fit the exterior forward portion of the airfoil, fastening elements connecting said fitting and said spar, said elements extending through holes lying closely adjacent said thickened nose section and said rearward vertical spar wall.

7. An aircraft rotor blade of airfoil cross section having a center of pressure at approximately 25% of the chord, a spar member, said spar member having upper and lower sections engaging along a generally horizontal plane, each of said sections having a nose portion, an airfoil contour portion extending rearwardly from said nose portion and a rear wall portion, a flange structure extending rearwardly both at the contour portion of said spar section and at the center part of said section adjacent the horizontal plane, the nose portion having an integral wall at least twice as thick as the rearwardly extending portion, said flange structure having a dimension in the chordwise direction of the blade at least several times as great as the thickness of the rear wall portion, the surface of said flange and said nose portion along the horizontal plane thus forming a large area cementing surface.

8. An aircraft rotor blade having an airfoil section with its center of pressure at approximately 25 percent of its chord, a spar member located in the forward portion of said blade, said spar member being composed of upper and lower sections, each of said sections being formed as an integral extrusion having a thickened nose portion, a thin walled airfoil contour portion extending rearwardly from said nose portion and a rear wall portion, said rear wall portion having attached thereto rearwardly extending flanges at the airfoil contour and at the mid section of the blade spar.

References Cited in the file of this patent

UNITED STATES PATENTS

| | | |
|---|---|---|
| 2,567,124 | Roberts | Sept. 4, 1951 |
| 2,591,757 | Young | Apr. 8, 1952 |
| 2,596,818 | Meyers | May 13, 1952 |
| 2,600,048 | Conwell | June 10, 1952 |
| 2,613,893 | Young | Oct. 14, 1952 |
| 2,754,915 | Echeverria | July 17, 1956 |

FOREIGN PATENTS

| | | |
|---|---|---|
| 535,229 | Great Britain | Apr. 2, 1941 |
| 625,778 | Great Britain | July 4, 1949 |
| 1,009,798 | France | Mar. 12, 1952 |